(12) United States Patent
Maggenti et al.

(10) Patent No.: US 9,888,393 B2
(45) Date of Patent: Feb. 6, 2018

(54) METHOD AND APPARATUS FOR AUTOMATIC CONFIGURATION OF WIRELESS COMMUNICATION NETWORKS

(75) Inventors: Mark Maggenti, Del Mar, CA (US); Dan Vassilovski, Del Mar, CA (US)

(73) Assignee: QUALOCMM Incorporated, San Diego, CA (US)

( * ) Notice: Subject to any disclaimer, the term of this patent is extended or adjusted under 35 U.S.C. 154(b) by 891 days.

(21) Appl. No.: 11/079,539

(22) Filed: Mar. 10, 2005

(65) Prior Publication Data

US 2006/0203746 A1    Sep. 14, 2006

(51) Int. Cl.
*H04W 24/02* (2009.01)
*H04L 12/24* (2006.01)
*H04W 84/18* (2009.01)

(52) U.S. Cl.
CPC ......... *H04W 24/02* (2013.01); *H04L 41/0806* (2013.01); *H04L 41/0816* (2013.01); *H04L 41/0886* (2013.01); *H04W 84/18* (2013.01); *Y04S 40/162* (2013.01)

(58) Field of Classification Search
CPC ............. H04L 41/0886; H04L 41/0806; H04L 41/0816; H04W 84/18; H04W 24/02; Y04S 40/162
See application file for complete search history.

(56) References Cited

U.S. PATENT DOCUMENTS

| | | | |
|---|---|---|---|
| 5,317,593 A * | 5/1994 | Fulghum et al. | 370/342 |
| 5,450,616 A * | 9/1995 | Rom | 455/69 |
| 5,724,665 A | 3/1998 | Abbasi et al. | |
| 6,129,604 A * | 10/2000 | Maveddat et al. | 455/453 |
| 6,240,092 B1 | 5/2001 | Moench | |
| 6,317,453 B1 * | 11/2001 | Chang | 375/140 |
| 6,535,732 B1 * | 3/2003 | McIntosh et al. | 455/445 |

(Continued)

FOREIGN PATENT DOCUMENTS

| | | |
|---|---|---|
| CN | 1422464 A | 6/2003 |
| EP | 1120983 A1 | 8/2001 |

(Continued)

OTHER PUBLICATIONS

"Dynamic LAN Reconfiguration Mechanism" IBM Technical Disclousure Bulletin, IBM Corp. New York, US, vol. 37, No. 11, (Nov. 1, 1994), pp. 407-410, XP000487282, ISSN: 0018-8689, p. 407, line 1—p. 409, line 2 p. 409, line 9-410, line 10.

(Continued)

*Primary Examiner* — Walter Divito
(74) *Attorney, Agent, or Firm* — Patterson & Sheridan, LLP (57) ABSTRACT

Method and apparatus for automatically reconfiguring a wireless communication network provides for receiving information from at least one node indicating a change in the network and automatically reconfiguring the network based on the received information. In another embodiment, a method for automatically reconfiguring a wireless communication network, including at least one node that includes wireless infrastructure resources, includes determining availability of a resource at a node operating in the network and automatically configuring the network based on the availability of the resource such that the network operates properly and/or efficiently.

63 Claims, 3 Drawing Sheets (56) References Cited

U.S. PATENT DOCUMENTS

| | | | |
|---|---|---|---|
| 6,597,910 B1 * | 7/2003 | Ra | H04W 76/04 455/433 |
| 6,618,432 B1 * | 9/2003 | Ganesh | 375/147 |
| 6,970,721 B1 * | 11/2005 | Gnesda et al. | 455/562.1 |
| 7,031,266 B1 * | 4/2006 | Patel et al. | 370/254 |
| 7,499,700 B2 * | 3/2009 | Dillon et al. | 455/423 |
| 2001/0042139 A1 * | 11/2001 | Jeffords et al. | 709/316 |
| 2002/0009991 A1 * | 1/2002 | Lu et al. | 455/422 |
| 2002/0042274 A1 | 4/2002 | Ades | |
| 2002/0119796 A1 * | 8/2002 | Vanghi | 455/522 |
| 2003/0224775 A1 * | 12/2003 | Suda et al. | 455/422.1 |
| 2004/0132486 A1 * | 7/2004 | Halonen et al. | 455/552.1 |
| 2004/0157613 A1 | 8/2004 | Steer et al. | |
| 2004/0203459 A1 * | 10/2004 | Borras-Chia et al. | 455/67.13 |
| 2004/0203787 A1 | 10/2004 | Naghian | |
| 2004/0204097 A1 * | 10/2004 | Scheinert et al. | 455/561 |
| 2004/0228279 A1 * | 11/2004 | Midtun et al. | 370/236 |
| 2005/0025144 A1 * | 2/2005 | O'Mahony | 370/389 |
| 2005/0054331 A1 * | 3/2005 | Balachandran et al. | 455/414.1 |
| 2005/0148368 A1 * | 7/2005 | Scheinert et al. | 455/561 |
| 2005/0232370 A1 * | 10/2005 | Trachewsky et al. | 375/267 |
| 2006/0120384 A1 * | 6/2006 | Boutboul et al. | 370/400 |
| 2009/0219804 A1 * | 9/2009 | Cole et al. | 370/218 |
| 2011/0200026 A1 * | 8/2011 | Ji et al. | 370/338 |

FOREIGN PATENT DOCUMENTS

| | | |
|---|---|---|
| EP | 1331760 A1 | 7/2003 |
| GB | 2394146 A | 4/2004 |
| JP | 5284088 A | 10/1993 |
| JP | 6502290 | 3/1994 |
| JP | 11215552 A | 8/1999 |
| JP | 2001511960 | 8/2001 |
| JP | 2001522180 A | 11/2001 |
| JP | 2003289302 A | 10/2003 |
| JP | 2003309508 A | 10/2003 |
| JP | 2004147079 A | 5/2004 |
| JP | 2004274100 A | 9/2004 |
| JP | 2005515695 A | 5/2005 |
| KR | 20050016649 A | 2/2005 |
| WO | WO9221182 A1 | 11/1992 |
| WO | WO 98/17032 | 4/1998 |
| WO | 0186988 A1 | 11/2001 |
| WO | WO 02/07473 A1 | 1/2002 |
| WO | WO-02103988 A1 | 12/2002 |
| WO | WO-03061175 A2 | 7/2003 |
| WO | 2005015917 A2 | 2/2005 |

OTHER PUBLICATIONS

Jubin et al, 'The DARPA Packet Radio Network Protocols' Proceedings of the IEEE, IEEE. New Yoirk, US, vol. 75, No. 1 (Jan. 1987),pp. 21-32 ISSN: 0018-9219 abstract p. 21, right-hand column, line 10—p. 23, right-hand column, line 1 p. 23, right-hand column, line 38—p. 25, left-hand column, line 22.
International Search Report and Written Opinion—PCT/US2006/008795, International Search Authority—European Patent Office—Jul. 6, 2006.
European Search Report—EP13150104—Search Authority—Munich—Mar. 12, 2013.
European Search Report—EP13150106—Search Authority—Munich—Mar. 14, 2013-.
Taiwan Search Report—TW095108056—TIPO—Jan. 2, 2013.
European Search Report—EP16194449—Search Authority—Munich—Dec. 15, 2016.

\* cited by examiner

METHOD AND APPARATUS FOR AUTOMATIC CONFIGURATION OF WIRELESS COMMUNICATION NETWORKS

FIELD

The disclosed embodiments relate to automatic configuration of wireless communication networks. More specifically, the disclosed embodiments relate to methods and apparatus for automatic configuration of network parameters and coverage as well as dynamic resource discovery in a wireless communication network.

BACKGROUND

In wireless communications networks, there is a need for determining the optimal configuration, organization, and operating parameters for wireless communications infrastructures, such as proper site locations, operating frequencies, radiated power, code assignments, handoff thresholds, etc. Currently, wireless communication network planning requires significant a priori analysis followed by follow-on empirical verification, testing and network adjustments, which are time consuming, expensive, and require network planning experts and sophisticated tools.

In some environments and applications, such as in military and emergency applications, there may be a need for deploying additional replacement or stand-alone autonomous wireless infrastructures without having sufficient time and/or resources to go through the lengthy and laborious manual network planning of such dynamic networks.

There is a need, therefore, for rapid, automatic configuration and organization of wireless networks as well as dynamic network planning and/or resource discovery.

SUMMARY

The disclosed embodiments provide for novel and improved methods and apparatus for automatically configuring and reconfiguring a wireless communication network. In one aspect, the method provides for receiving information indicating a change in the network and automatically reconfiguring the network based on the received information.

In one aspect, a method for automatically reconfiguring a wireless communication network, including at least one node that includes wireless infrastructure resources, provides for determining availability of a resource at a node operating in the network and automatically reconfiguring the network based on the availability of the resource such that the network operates properly and/or efficiently.

In another aspect, an apparatus for automatically reconfiguring a wireless communication network includes a memory unit, a receiver, a transmitter, and a processor communicatively coupled with the memory unit, the receiver, and the transmitter. The processor is capable of executing instructions to carry out the above-mentioned methods.

BRIEF DESCRIPTION OF THE DRAWINGS

The features and advantages of the disclosed embodiments will become more apparent from the detailed description of the embodiments in connection with the drawings set forth below.

DETAILED DESCRIPTION

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

Figure 1A:
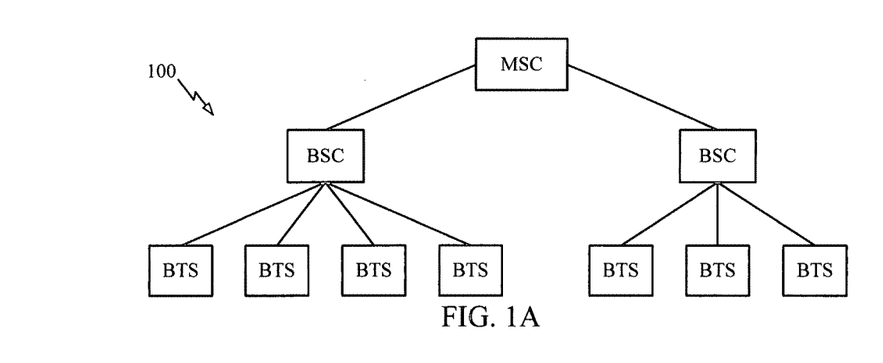
FIG. 1A illustrates a first wireless communication network topology.

FIG. 1A illustrates a first wireless communication network topology 100, for implementing one embodiment. Communication network 100 illustrates an infrastructure topology where a number of BTSs are supported by one BSC, and a number of BSCs are also supported by one MSC.

Network planning for such network topology may include the following steps:

Topographic maps of the coverage area are analyzed,

Candidate site locations and other network parameters are chosen, considering terrain and capacity requirements as function of location, Simulation software is run to analyze the system performance and capacity, Parameters and locations are adjusted, and simulations are re-run, After network construction, drive tests are performed to validate network coverage, capacity, and performance, and Drive test data is analyzed. The above process is repeated.

The topology shown in FIG. 1A may stay static in terms of its infrastructure components availability, locations, capability, etc. However, changes such as infrastructure components relocation, addition, deletion, malfunction, and/or external factors, may dynamically change the topology of the network. In such cases, for example when a new BTS is added to or dropped from the network, the network may be manually re-planned and reconfigured. This is partly due to the fact that the BTSs are not able to detect or sense ("hear or see") other BTSs; in the same way as they are able to detect or sense mobile devices. That is, BTSs detect the reverse link wireless communication (signaling, voice and data communication from mobile device to wireless infrastructure) from nearby mobile devices, but BTSs do not detect the forward link wireless communication (signaling, voice and data communication from wireless infrastructure to mobile device) from other BTSs. For example, in a CDMA system a newly added node (e.g., BTS) has to be assigned a unique PN offset, but a network planner has to first figure out what PN offsets have been already assigned to other existing nodes before assigning a unique one to the added node. In such cases, going through the above network planning routine is not practical.

Figure 1B:
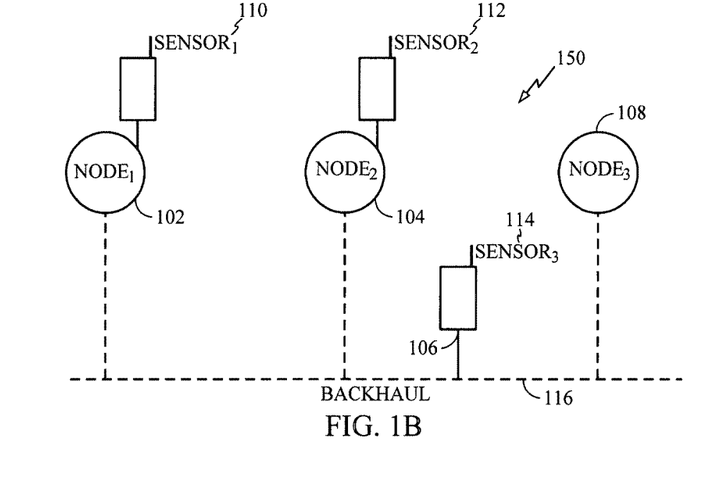
FIG. 1B illustrates a second wireless communication network topology.

FIG. 1B illustrates a network topology, according to one embodiment, where nodes 102, 104, 106 are provided with some sensor receiver or a sensor receiver/transmitter capability 110, 112, 114 such that these nodes are able to communicate with each other. In this way, a node 102, 104, 106 receives forward link communications from some or all nodes 102, 104, 106, 108 in the network, determines or calculates some network parameters, and communicates the parameters, e.g., through the backhaul 116 or otherwise, to other nodes. A node that receives the parameters may adjust, reconfigure, or set its operating condition according to the received parameters or feedbacks from the other nodes. Such exchange of information includes announcing changes in the topology, such as relocation, addition, deletion, and/or malfunction of a node, changes in the resource availability, capability, presence, absence, and/or data measured by the sensor receiver. The exchange of such information may allow the network infrastructure to automatically determine network status and if required, reconfigure themselves and/or other network components when a change occurs.

In one embodiment, the sensors provided on a node may include a mobile phone with backhaul connection (such as an IP backhaul connection) that receives and sends information from and to other existing nodes. For example, node 106 may include only a sensor receiver, e.g., a mobile device, which may be carried around by a user, mounted on a vehicle, or kept stationary at a location. In this way, nodes may communicate with each other and exchange network-wide or locally measured parameters, such as handoff parameters, neighbor lists for each node, operating frequencies and codes, power transmission levels, received power levels from other nodes, PN offsets measurements for signals broadcast by other nodes, antenna configuration, and other information required for wireless infrastructure operation, including detection of other wireless infrastructures.

In one embodiment, the intelligent, sensor-enabled nodes communicate with other nodes and exchange information about their operating condition, such as their power levels, and multicast/broadcast this information, e.g. through the backhaul, to other nodes that may monitor and/or adjust their operating conditions, such as power levels, coverage, and antenna patterns and orientation. Adaptive algorithms based on sensor data may be employed for adjusting operating conditions such as varying transmit power and antenna pattern characteristics. These algorithms adaptively maximize coverage and may cause some nodes in the network to disable themselves or some of their capabilities in favor of other nodes; thus, preventing resource over-allocation or degrading network performance (preventing the "pilot pollution" problem, for example).

Messages communicated among the nodes may be appropriately encrypted and authenticated to protect the network from hostile denial of service (DOS) attacks. In the absence of such security measures, an untrusted party could impair the correct operation of the mobile network by sending invalid or malicious sensor measurement data or resource availability data.

Figure 2:
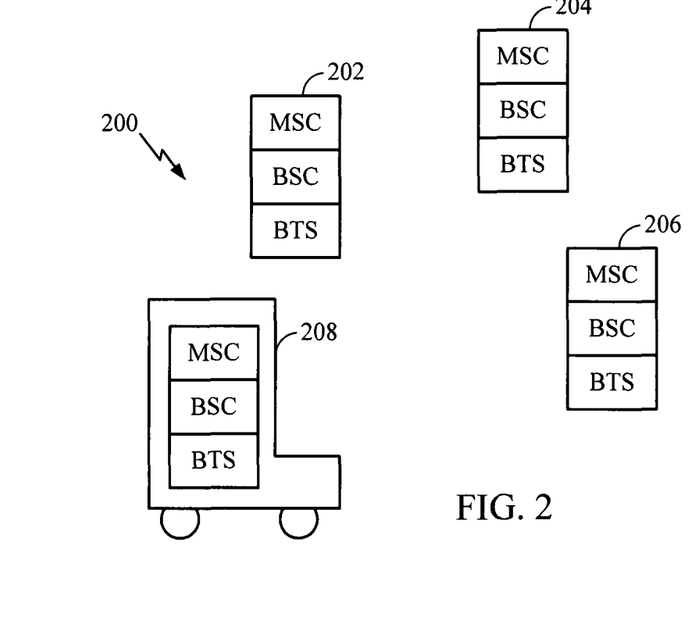
FIG. 2 illustrates a third wireless communication network topology.

FIG. 2 illustrates a wireless communication network topology 200, for implementing one embodiment. Communication network 200 illustrates a dynamic infrastructure topology where each node may be fully self-contained; i.e., each may have full BTS, BSC, and/or MSC functionality.

In one embodiment, the nodes may be operating in isolation from each other. For example, a vehicle-mounted BTS may be providing wireless communication coverage all by itself (autonomously) for a team. In this case, each isolated node is fully self-contained, having full autonomous wireless network functionality, including for example BTS, BSC, MSC and/or other functionality to support autonomous operation. This scenario may happen in sparsely populated or rural areas, where a single node may be installed, or when a vehicle drives in a desert-like area with no nearby network.

In one embodiment, the nodes 202, 204, 206, 208, which may be stationary or mobile, are dynamically operating in concert to provide continuous wireless communication coverage over a wide area, similar to a commercial cellular system in an urban area, but with a dynamically varying topology. In this case, since every node may be fully functional, there may be more resources of some types than are needed. Thus, the network needs to automatically configure/reconfigure itself for proper and/or efficient use of the available infrastructure resources. Generally, there is need for one BSC per a group of BTS's. However, when all nodes have individual BSC capability, one node may be automatically elected to provide or share BSC functionality for a group of BTSs. In one embodiment, as shown in FIG. 2, Nodes 202, 204, and 206 may be in close proximity of each other; therefore, one node may be automatically selected for providing MSC and/or BSC capability, as well as other functions required for wireless network operation, with the other nodes functioning as simple BTSs.

In one embodiment, as shown in FIG. 2, mobile node 208, e.g., mounted on a moving object, which may have been operating isolated from other nodes in a self-contained mode, enters the coverage area of nodes 202, 204, and 206. However, after nodes 202, 204, 206, 208 disseminate their resource availability and/or capability among each other (via broadcast and/or multicast, for example), and moving node 208 determines that it has entered an area covered by other nodes, moving node 208 may automatically turn off its MSC and/or BSC capability and function as a BTS; thus, starting to be covered by the BSC and/or MSC capability provided by one or more of the other nodes 202, 204, and 206. However, when the moving node 208 leaves the coverage area of nodes 202, 204, and 206 and its movement results in it being in isolation from other nodes, node 208 may use its full resource capability. When the moving node 208 ends up again in proximity to other nodes, the moving node 208 may negotiate and automatically reconfigure itself in concert with the nearby nodes.

In another embodiment, mobile node 208 may enter the coverage area of nodes 202, 204 and 206 and may determine through the measurement of the received signal strength of nodes 202, 204, and 206 that its location is already adequately covered by these nodes, and may decide not to even function as a BTS at this time.

In another embodiment, certain nodes may provide connectivity to external networks and/or resources. In this case, such nodes may advertise their special ability to other nodes so that the nodes automatically reconfigure themselves to utilize the newly advertised resource capability. Advertised resources could include connectivity to particular circuit switched or data networks, communications processors such as asynchronous communications interworking functions (IWFs, modem banks), packet data serving nodes, media gateways, e-mail or voice mail servers, etc.

Many techniques may be used to automatically configure the network after communication of the resource availability and sensor data information. This information could be communicated to a central processor which evaluates the information, computes a new network configuration, and then communicates this new configuration to the affected nodes. In one embodiment, distributed automatic configuration schemes may be used. Sensor and resource availability information may be broadcast or multicast to other nodes using techniques such as IP Multicast. Nodes capable of providing a service can broadcast their willingness to do so, and conflicts among multiple nodes offering to provide the same service can be resolved through an iterative process based on a random variable generation and voting. Such services can include not only those services necessary to execute wireless network operation, such as BSC, MSC, PDSN, etc., but also the central processor functionality for evaluating network information gleaned by the various nodes. Similar procedures are used in protocols such as IPv6, for instance, to automatically assign IP addresses to IP devices. Communication of this information can be triggered by a number of criteria, including timer-based, exceeding pre-determined or dynamic operating or detection thresholds, or upon request. After the network is configured, the new configuration can be updated in a DNS or similar database for nodes to discover the configuration between reconfiguration events. DNS, through the use of service (SRV) records, or protocols such as DHCP can be used to furnish arbitrary network service and configuration information, for example. Nodes may independently adjust some of their operating parameters, such as their transmit power level, based on sensor data broadcast by other nodes indicating the level at which their signal is received by such other nodes. Dissemination of these operating parameter adjustments to other nodes can be automatic, or based on pre-determined criteria, such as assigned thresholds, timers or system configuration.

In one embodiment, dynamic resource recovery also adaptively compensates for dynamic load changes and/or node failure. In one embodiment, existing resources may broadcast requests for extra help when they are overloaded. Requests for assistance could include requests for additional wireless call processing resources (e.g., BSC resources), interfaces to external networks, additional RF wireless coverage to support additional wireless users, etc. Existing nodes automatically reassign resources among themselves based on location changes, load changes, etc. Nodes that use resources located on other nodes, which may have left the coverage area or failed to properly operate, detect the failure and/or absence of such resources and initiate resource recovery and/or network parameter reconfiguration; thus, having the ability to add additional resources or reassign the existing ones on need basis, as the topology of the network dynamically changes. Resource allocation could include releasing BSC call processing resources that may have been allocated in support of other nodes, backhaul services to nodes no longer in proximity, RF assignments that have been supplanted by other nodes, etc.

Figure 3:
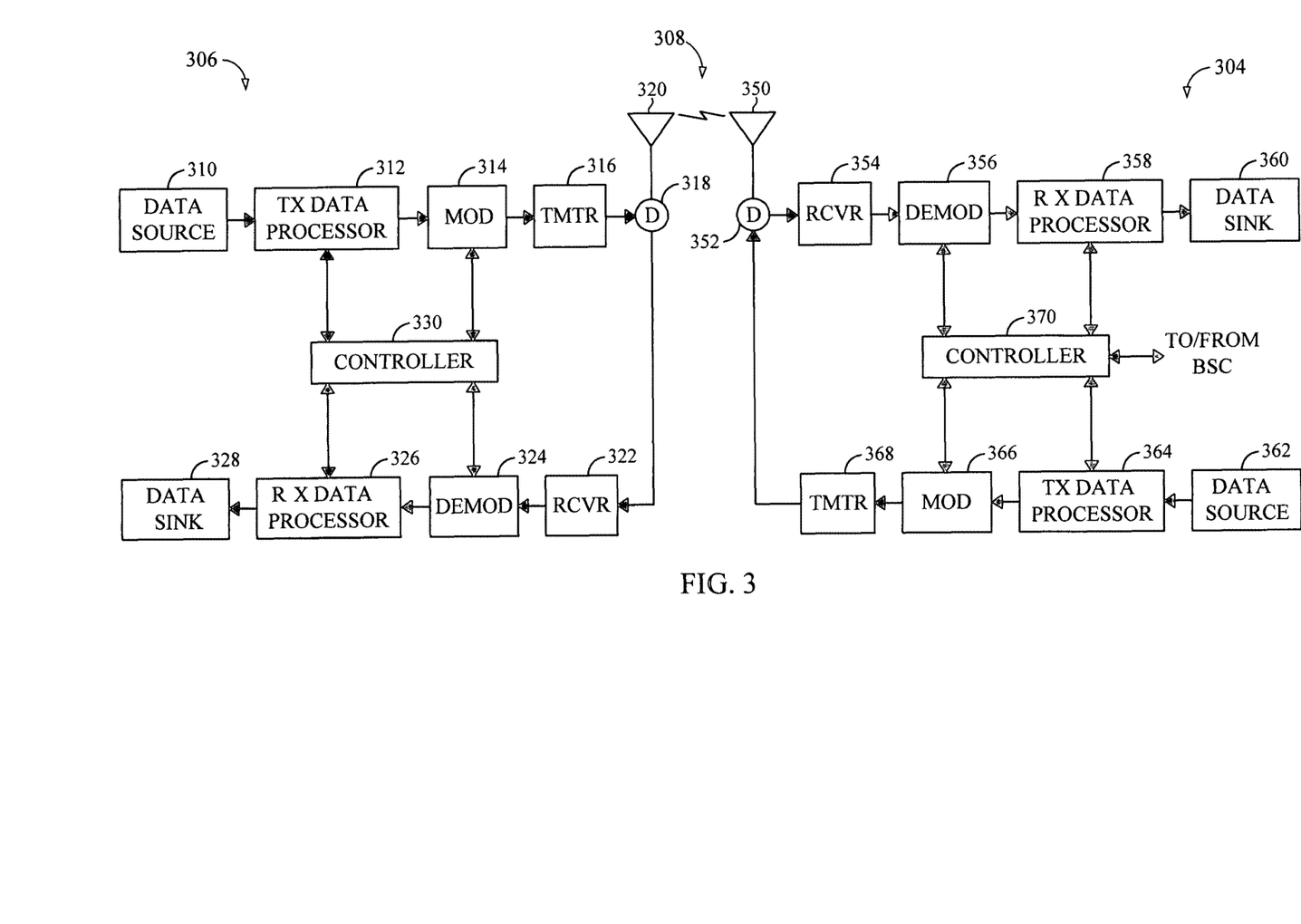
FIG. 3 illustrates one embodiment for implementing a wireless communications infrastructure.

FIG. 3 is a simplified block diagram of an embodiment of an infrastructure node 304 and a communication device 306, which are capable of implementing various disclosed embodiments. For a particular media communication, voice, data, packet data, and/or alert messages may be exchanged between the infrastructure node 304 and communication device 306, via an air interface 308. Various types of messages may be transmitted, such as messages used to establish a communication session between the node and the communication device, registration and paging messages, and messages used to control a data transmission (e.g., power control, data rate information, acknowledgment, and so on). Some of these message types are described in further detail below.

For the reverse link, at communication device 306, voice and/or packet data (e.g., from a data source 310) and messages (e.g., from a controller 330) are provided to a transmit (TX) data processor 312, which formats and encodes the data and messages with one or more coding schemes to generate coded data. Each coding scheme may include any combination of cyclic redundancy check (CRC), convolutional, turbo, block, and other coding, or no coding at all. The voice, packet data, and messages may be coded using different schemes, and different types of messages may be coded differently.

The coded data is then provided to a modulator (MOD) 314 and further processed (e.g., covered, spread with short PN sequences, and scrambled with a long PN sequence assigned to the communication device). The modulated data is then provided to a transmitter unit (TMTR) 316 and conditioned (e.g., converted to one or more analog signals, amplified, filtered, and quadrature modulated) to generate a reverse link signal. The reverse link signal is routed through a duplexer (D) 318 and transmitted via an antenna 320 to the infrastructure node 304.

At the infrastructure node 304, the reverse link signal is received by an antenna 350, routed through a duplexer 352, and provided to a receiver unit (RCVR) 354. Alternatively, the antenna may be part of the wireless operator network, and the connection between the antenna and the BS/BSC may be routed through the Internet. The infrastructure node 304 may receive media information and alert messages from communication device 306. Receiver unit 354 conditions (e.g., filters, amplifies, down converts, and digitizes) the received signal and provides samples. A demodulator (DEMOD) 356 receives and processes (e.g., despreads, decovers, and pilot demodulates) the samples to provide recovered symbols. Demodulator 356 may implement a rake receiver that processes multiple instances of the received signal and generates combined symbols. A receive (RX) data processor 358 then decodes the symbols to recover the data and messages transmitted on the reverse link. The recovered voice/packet data is provided to a data sink 360 and the recovered messages may be provided to a controller 370. Controller 370 may include instructions for receiving and sending information, receiving and sending responses to messages, identifying availability, capability, location, and/or presence of infrastructure resources, locating infrastructure nodes, determining the types of infrastructure resources, reconfiguring the network parameters, determining network parameters based on forward link communications received from other nodes, adjusting operating conditions based on network parameters received from other nodes, and recovering infrastructure resources. The processing by demodulator 356 and RX data processor 358 are complementary to that performed at remote access device 306. Demodulator 356 and RX data processor 358 may further be operated to process multiple transmissions received via multiple channels, e.g., a reverse fundamental channel (R-FCH) and a reverse supplemental channel (R-SCH). Also, transmissions may be simultaneously from multiple communication devices, each of which may be transmitting on a reverse fundamental channel, a reverse supplemental channel, or both.

On the forward link, at the infrastructure node 304, voice and/or packet data (e.g., from a data source 362) and messages (e.g., from controller 370) are processed (e.g., formatted and encoded) by a transmit (TX) data processor 364, further processed (e.g., covered and spread) by a modulator (MOD) 366, and conditioned (e.g., converted to analog signals, amplified, filtered, and quadrature modulated) by a transmitter unit (TMTR) 368 to generate a forward link signal. The forward link signal is routed through duplexer 352 and transmitted via antenna 350 to remote access device 306. Forward link signals include paging signals.

At communication device 306, the forward link signal is received by antenna 320, routed through duplexer 318, and provided to a receiver unit 322. Receiver unit 322 conditions (e.g., down converts, filters, amplifies, quadrature modulates, and digitizes) the received signal and provides samples. The samples are processed (e.g., despreaded, decovered, and pilot demodulated) by a demodulator 324 to provide symbols, and the symbols are further processed (e.g., decoded and checked) by a receive data processor 326 to recover the data and messages transmitted on the forward link. The recovered data is provided to a data sink 328, and the recovered messages may be provided to controller 330. Controller 330 may include instructions for receiving and sending information, receiving and sending responses to messages, identifying availability, capability, location, and/or presence of infrastructure resources, locating infrastructure nodes, determining the types of infrastructure resources, reconfiguring the network parameters, determining network parameters based on forward link communications received from other nodes, adjusting operating conditions based on network parameters received from other nodes, and recovering infrastructure resources. Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers; a hard disk, a removable disk, a MS-ROM, or any other form of storage medium or computer-readable medium known in the art. An exemplary storage medium is coupled to the processor, such that the processor can read information from, and write information to, the storage medium. In the alternative, the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein.

The invention claimed is:

1. A method for reconfiguring a wireless communication network, the method comprising:
receiving, at a first Base Transceiver Station (BTS), an indication of an overload at a second BTS from the second BTS, the indication transmitted by the second BTS in response to a determination by the second BTS that a load change at the second BTS has caused the overload;
assigning resources at the first BTS based on the indication of the overload received from the second BTS to reduce the overload at the second BTS;
receiving, at the first BTS, information indicating power transmission levels at the second BTS; and
reconfiguring, by the first BTS, the first BTS based on the received information indicating the power transmission levels at the second BTS.

2. The method of claim 1, further comprising:
receiving, at the first BTS, information indicating a change in topology of the network; and
reconfiguring a network parameter based on the received information.

3. The method of claim 2, wherein said network parameter comprises a handoff parameter.

4. The method of claim 2, wherein said network parameter comprises a PN offset for identifying the first BTS in the network.

5. The method of claim 2, further comprising reconfiguring radiated power at the first BTS based on the received information.

6. The method of claim 5, further comprising reconfiguring antenna characteristics at the first BTS based on the received information.

7. The method of claim 2, further comprising disabling the first BTS based on the received information.

8. The method of claim 2, further comprising adding a resource to the network based on the received information.

9. The method of claim 2, further comprising reassigning a resource in the network based on the received information.

10. The method of claim 2, wherein said receiving the information comprises receiving multicast information.

11. The method of claim 2, wherein said receiving the information comprises receiving broadcast information.

12. The method of claim 2, wherein the change in topology of the network is a deletion of a node from the network.

13. The method of claim 2, wherein the change in topology of the network is a malfunction of a node in the network.

14. The method of claim 1, further comprising:
receiving, at the first BTS, a neighbor list from the second BTS over a forward link communication; and reconfiguring, by the first BTS, a neighbor list of the first BTS based on the neighbor list received from the second BTS.

15. The method of claim 1, further comprising:
receiving, at the first BTS, a neighbor list from the second BTS via a backhaul connection between the first BTS and the second BTS; and
reconfiguring, by the first BTS, a neighbor list of the first BTS based on the neighbor list received from the second BTS.

16. The method of claim 1, further comprising:
receiving, at the first BTS, information indicating a change in configuration of the network; and
reconfiguring the first BTS based on the received information.

17. The method of claim 1, further comprising:
receiving, at the first BTS, information indicating an antenna configuration at the second BTS; and
reconfiguring the first BTS based on the received information indicating the antenna configuration.

18. The method of claim 1, wherein the resources comprise radio frequency (RF) resources.

19. A non-transitory computer-readable medium storing instructions thereon for enabling a processor to perform a method for reconfiguring a wireless communication network, the method comprising:
receiving, at a first Base Transceiver Station (BTS), an indication of an overload at a second BTS from the second BTS, the indication transmitted by the second BTS in response to a determination by the second BTS that a load change at the second BTS has caused the overload;
assigning resources at the first BTS based on the indication of the overload received from the second BTS to reduce the overload at the second BTS;
receiving, at the first BTS, information indicating power transmission levels at the second BTS; and
reconfiguring, by the first BTS, the first BTS based on the received information indicating the power transmission levels at the second BTS.

20. The non-transitory computer-readable medium of claim 19, wherein the method further comprises:
receiving, at the first BTS, a neighbor list from the second BTS over a forward link communication; and
reconfiguring, by the first BTS, a neighbor list of the first BTS based on the neighbor list received from the second BTS.

21. An apparatus for reconfiguring a wireless communication network, comprising:
means for receiving, at a first Base Transceiver Station (BTS), an indication of an overload at a second BTS from the second BTS, the indication transmitted by the second BTS in response to a determination by the second BTS that a load change at the second BTS has caused the overload;
means for assigning resources at the first BTS based on the indication of the overload received from the second BTS to reduce the overload at the second BTS;
means for receiving, at the first BTS, information indicating power transmission levels at the second BTS; and
means for reconfiguring, by the first BTS, the first BTS based on the received information indicating the power transmission levels at the second BTS.

22. The apparatus of claim 21, further comprising:
means for receiving, at the first BTS, a neighbor list from the second BTS over a forward link communication; and
means for reconfiguring, by the first BTS, a neighbor list of the first BTS based on the neighbor list received from the second BTS.

23. An apparatus for reconfiguring a wireless communication network, comprising:
a receiver adapted to:
receive, at a first Base Transceiver Station (BTS), an indication of an overload at a second BTS from the second BTS, the indication transmitted by the second BTS in response to a determination by the second BTS that a load change at the second BTS has caused the overload; and
receive, at the first BTS, information indicating power transmission levels at the second BTS; and
a processor adapted to:
assign resources at the first BTS based on the indication of the overload received from the second BTS to reduce the overload at the second BTS; and
reconfigure, by the first BTS, the first BTS based on the received information indicating the power transmission levels at the second BTS.

24. The apparatus of claim 23, wherein the receiver is further adapted to receive, at the first BTS, a neighbor list from the second BTS over a forward link communication, and the processor is further adapted to reconfigure a neighbor list of the first BTS based on the neighbor list received from the second BTS.

25. A method for reconfiguring a wireless communication network, the method comprising:
determining availability of a resource in the network based on information received at a first node from a second node, wherein the information announces Base Station Controller (BSC) capability of the second node, and wherein the first node has BSC capability;
receiving a signal at the first node from the second node;
measuring a strength of the received signal; and
reconfiguring the first node based on the availability of the resource and the measured strength of the received signal, wherein said reconfiguring comprises choosing one BSC to support a plurality of Base Transceiver Stations (BTSs) within said network, said BSC being chosen from a plurality of nodes including the first node and the second node.

26. The method of claim 25, wherein said determining the availability comprises determining that the second node is added to the network.

27. The method of claim 26, wherein said reconfiguring further comprises using a resource on the added node.

28. The method of claim 25, wherein said reconfiguring further comprises causing at least one of the plurality of nodes to turn off a BTS or Mobile Switching Center (MSC) capability.

29. A non-transitory computer-readable medium storing instructions thereon for enabling a processor to perform a method for reconfiguring a wireless communication network, the method comprising:
determining availability of a resource in the network based on information received at a first node from a second node, wherein the information announces Base Station Controller (BSC) capability of the second node, and wherein the first node has BSC capability;
receiving a signal at the first node from the second node;
measuring a strength of the received signal; and reconfiguring the first node based on the availability of the resource and the measured strength of the received signal, wherein said reconfiguring comprises choosing one BSC to support a plurality of Base Transceiver Stations (BTSs) within said network, said BSC being chosen from a plurality of nodes including the first node and the second node.

30. An apparatus for reconfiguring a wireless communication network, comprising:
means for determining availability of a resource in the network based on information received at a first node from a second node, wherein the information announces Base Station Controller (BSC) capability of the second node, and wherein the first node has BSC capability; and
means for receiving a signal at the first node from the second node;
means for measuring a strength of the received signal; and
means for reconfiguring the first node based on the availability of the resource and the measured strength of the received signal, wherein said reconfiguring comprises choosing one BSC to support a plurality of Base Transceiver Stations (BTSs) within said network, said BSC being chosen from a plurality of nodes including the first node and the second node.

31. An apparatus for reconfiguring a wireless communication network, comprising:
a receiver capable of receiving information and a signal at a first node from a second node;
a transmitter capable of transmitting information; and
a processor capable of carrying out a method for reconfiguring a wireless communication network, the method comprising:
determining availability of a resource in the network based on information received at the first node from the second node, wherein the information announces Base Station Controller (BSC) capability of the second node, and wherein the first node has BSC capability;
measuring a strength of the received signal; and
reconfiguring the first node based on the availability of the resource and the measured strength of the received signal, wherein said reconfiguring comprises choosing one BSC to support a plurality of Base Transceiver Stations (BTSs) within said network, said BSC being chosen from a plurality of nodes including the first node and the second node.

32. A method for configuring a wireless communication network, the method comprising:
receiving, by a first Base Transceiver Station (BTS) supported by a Base Station Controller (BSC), a forward link communication from a second BTS operating in the wireless communication network and supported by the BSC, the forward link communication announcing to the first BTS that the second BTS sensed a change in topology of the wireless communication network;
determining, by the first BTS, operational information related to the wireless communication network based on the forward link communication; and
forwarding, by the first BTS, the operational information to a third BTS operating in the wireless communication network and supported by the BSC, such that the third BTS may configure itself based on the operational information,
wherein the operational information comprises received power level of the third BTS at the second BTS, and
wherein the change in topology of the wireless communication network is at least one of an addition of a node to the wireless communication network, a relocation of a node within the wireless communication network, a deletion of a node from the wireless communication network, or a malfunction of a node in the wireless communication network.

33. The method of claim 32, wherein the operational information further comprises a change in the capability of the second BTS.

34. The method of claim 32, wherein the operational information further comprises a PN-Offset of the second BTS.

35. The method of claim 34, wherein the third BTS configures its PN-Offset.

36. The method of claim 32, wherein the third BTS configures its radiated power.

37. The method of claim 32, wherein the operational information further comprises handoff parameters of the second BTS.

38. The method of claim 37, wherein the third BTS configures its handoff parameters.

39. The method of claim 32, wherein the operational information further comprises neighbor lists of the second BTS.

40. The method of claim 39, wherein the third BTS configures its neighbor lists.

41. The method of claim 32, wherein the operational information further comprises operating frequencies and codes of the second BTS.

42. The method of claim 41, wherein the third BTS configures its operating frequencies and codes.

43. The method of claim 32, wherein the operational information further comprises at least one antenna configuration of the second BTS.

44. The method of claim 43, wherein the third BTS configures its antenna configuration.

45. The method of claim 32, wherein the change in topology of the network is a deletion of a node from the network.

46. The method of claim 32, wherein the change in topology of the network is a malfunction of a node in the network.

47. The method of claim 32, wherein the operational information determined by the first node further comprises at least one of a power level of the first node, a coverage area of the first node, or an antenna configuration of the first node.

48. A first Base Transceiver Station (BTS) supported by a Base Station Controller (BSC) for configuring a wireless communication network, comprising:
a receiver adapted to receive a forward link communication from a second BTS operating in the wireless communication network and supported by the BSC, the forward link communication announcing to the first BTS that the second BTS sensed a change in topology of the wireless communication network;
a processor adapted to determine operational information related to the wireless communication network based on the forward link communication; and
a transmitter adapted to forward the operational information to a third BTS operating in the wireless communication network and supported by the BSC, such that the third BTS may configure itself based on the operational information,
wherein the operational information comprises received power level of the third BTS at the second BTS, and wherein the change in topology of the wireless communication network is at least one of an addition of a node to the wireless communication network, a relocation of a node within the wireless communication network, a deletion of a node from the wireless communication network, or a malfunction of a node in the wireless communication network.

49. A first Base Transceiver Station (BTS) supported by a Base Station Controller (BSC) for configuring a wireless communication network, comprising:
   means for receiving a forward link communication from a second BTS operating in the wireless communication network and supported by the BSC, the forward link communication announcing to the first BTS that the second BTS sensed a change in topology of the wireless communication network;
   means for determining operational information related to the wireless communication network based on the forward link communication; and
   means for forwarding the operational information to a third BTS operating in the wireless communication network and supported by the BSC, such that the third BTS may configure itself based on the operational information,
   wherein the operational information comprises received power level of the third BTS at the second BTS, and
   wherein the change in topology of the wireless communication network is at least one of an addition of a node to the wireless communication network, a relocation of a node within the wireless communication network, a deletion of a node from the wireless communication network, or a malfunction of a node in the wireless communication network.

50. A non-transitory computer-readable medium storing instructions thereon for enabling a first Base Transceiver Station (BTS) supported by a Base Station Controller (BSC) to perform a method for configuring a wireless communication network, the method comprising:
   receiving a forward link communication from a second BTS operating in the wireless communication network and supported by the BSC, the forward link communication announcing to the first BTS that the second BTS sensed a change in topology of the wireless communication network;
   determining operational information related to the wireless communication network based on the forward link communication; and
   forwarding the operational information from the first BTS to a third BTS operating in the wireless communication network and supported by the BSC, such that the third BTS may configure itself based on the operational information,
   wherein the operational information comprises received power level of the third BTS at the second BTS, and
   wherein the change in topology of the wireless communication network is at least one of an addition of a node to the wireless communication network, a relocation of a node within the wireless communication network, a deletion of a node from the wireless communication network, or a malfunction of a node in the wireless communication network.

51. A first Base Transceiver Station (BTS) in a wireless communication network, the first BTS comprising:
   an antenna;
   a receiver adapted to:
      receive, via the antenna, an indication of an overload at a second BTS from the second BTS, the indication transmitted by the second BTS in response to a determination by the second BTS that a load change at the second BTS has caused the overload; and
      receive, via the antenna, information indicating power transmission levels at the second BTS; and
   a processor adapted to:
      assign resources based on the indication of the overload received from the second BTS to reduce the overload at the second BTS; and
      reconfigure the first BTS based on the received information indicating the power transmission levels at the second BTS.

52. The first BTS of claim 51, wherein the receiver is further adapted to receive a neighbor list from a second BTS over a forward link communication, and the processor is further adapted to reconfigure a neighbor list of the first BTS based on the neighbor list received from the second BTS.

53. A first node in a wireless communication network including a plurality of nodes, the first node comprising:
   an antenna;
   a receiver capable of receiving information and a signal from a second node via the antenna;
   a transmitter capable of transmitting information; and
   a processor capable of carrying out a method comprising:
      determining availability of a resource in the network based on information received at the first node from the second node, wherein the information announces Base Station Controller (BSC) capability of the second node, and wherein the first node has BSC capability;
      measuring a strength of the received signal; and
      reconfiguring the first node based on the availability of the resource and the measured strength of the received signal, wherein said reconfiguring comprises choosing one BSC to support a plurality of Base Transceiver Stations (BTSs) within said network, said BSC being chosen from the plurality of nodes including the first node and the second node.

54. A first Base Transceiver Station (BTS) supported by a Base Station Controller (BSC) in a wireless communication network, the first BTS comprising:
   an antenna;
   a receiver adapted to receive, via the antenna, a forward link communication from a second BTS operating in the network and supported by the BSC, the forward link communication announcing to the first BTS that the second BTS sensed a change in topology of the wireless communication network;
   a processor adapted to determine operational information related to the wireless communication network based on the forward link communication; and
   a transmitter adapted to forward, via the antenna, the operational information to a third BTS operating in the wireless communication network and supported by the BSC, such that the third BTS may configure itself based on the operational information,
   wherein the operational information comprises received power level of the third BTS at the second BTS, and
   wherein the change in topology of the wireless communication network is at least one of an addition of a node to the wireless communication network, a relocation of a node within the wireless communication network, a deletion of a node from the wireless communication network, or a malfunction of a node in the wireless communication network.

55. A method for reconfiguring a wireless communication network, comprising:

determining, by a first node operating as a first Base Station Controller (BSC), that a current location of the first node is within a geographic area that is receiving BSC coverage from a second node operating as a second BSC, wherein the first node is operating isolated from the second node;

in response to determining that the first node is within the geographic area that is receiving BSC coverage from the second node, automatically reconfiguring the first node to disable the BSC capability of the first node and operate as a Base Transceiver Station (BTS) relying on the second node for BSC capabilities;

detecting, by the first node, that the current location of the first node is no longer within the geographic area that is receiving BSC coverage from the second node; and in response to detecting that the current location of the first node is no longer within the geographic area that is receiving BSC coverage from the second node, automatically reconfiguring the first node to enable the BSC capability of the first node and operate as a BSC isolated from the second node.

56. The method of claim 55, further comprising determining whether the first node is within a coverage area of the second node, and wherein disabling the BSC capability of the first node is also based on the determination of whether the first node is within the coverage area of the second node.

57. A first node for reconfiguring a wireless communication network, comprising:
a receiver capable of receiving information;
a transmitter capable of transmitting information; and
a processor capable of carrying out a method for reconfiguring the wireless communication network, the method comprising:
determining that a current location of the first node is within a geographic area that is receiving Base Station Controller (BSC) coverage from a second node operating as a BSC, wherein the first node is operating as a BSC isolated from the second node;
in response to determining that the first node is within the geographic area that is receiving BSC coverage from the second node, automatically reconfiguring the first node to disable the BSC capability of the first node and operate as a Base Transceiver Station (BTS) relying on the second node for BSC capabilities;
detecting that the current location of the first node is no longer within the geographic area that is receiving BSC coverage from the second node; and
in response to detecting that the current location of the first node is no longer within the geographic area that is receiving BSC coverage from the second node, automatically reconfiguring the first node to enable the BSC capability of the first node and operate as a BSC isolated from the second node.

58. A first node for reconfiguring a wireless communication network, comprising:
means for determining that a current location of the first node is within a geographic area that is receiving Base Station Controller (BSC) coverage from a second node operating as a BSC, wherein the first node is operating as a BSC isolated from the second node;
means for automatically reconfiguring the first node to disable the BSC capability of the first node and operate as a Base Transceiver Station (BTS) relying on the second node for BSC capabilities in response to determining that the first node is within the geographic area that is receiving BSC coverage from the second node;
means for detecting that the current location of the first node is no longer within the geographic area that is receiving BSC coverage from the second node; and
means for automatically reconfiguring the first node to enable the BSC capability of the first node and operate as a BSC isolated from the second node in response to detecting that the current location of the first node is no longer within the geographic area that is receiving BSC coverage from the second node.

59. A non-transitory computer-readable medium storing instructions thereon that, when executed by a first node, cause the first node to perform a method for reconfiguring a wireless communication network, the method comprising:
determining that a current location of the first node is within a geographic area that is receiving Base Station Controller (BSC) coverage from a second node operating as a BSC, wherein the first node is operating as a BSC isolated from the second node;
in response to determining that the first node is within the geographic area that is receiving BSC coverage from the second node, automatically reconfiguring the first node to disable the BSC capability of the first node and operate as a Base Transceiver Station (BTS) relying on the second node for BSC capabilities;
detecting that the current location of the first node is no longer within the geographic area that is receiving BSC coverage from the second node; and
in response to detecting that the current location of the first node is no longer within the geographic area that is receiving BSC coverage from the second node, automatically reconfiguring the first node to enable the BSC capability of the first node and operate as a BSC isolated from the second node.

60. A method for reconfiguring a wireless communication network, the method comprising:
determining availability of a resource in the network based on information received at a first node from a second node, wherein the information announces Mobile Switching Center (MSC) capability of the second node, and wherein the first node has MSC capability;
determining a coverage area of the second node; and
reconfiguring the first node based on the availability of the resource and the determined coverage area of the second node, wherein said reconfiguring comprises choosing one MSC to support a plurality of Base Station Controllers (BSCs) within said network, said MSC being chosen from a plurality of nodes including the first node and the second node.

61. A non-transitory computer-readable medium storing instructions that, when executed by a first Base Transceiver Station (BTS), cause the first BTS to perform a method for reconfiguring a wireless communication network, the method comprising:
determining that at least a second BTS and a third BTS within a predetermined geographic distance of the first BTS each have Base Station Controller (BSC) capabilities, wherein the first BTS also has BSC capabilities and each of the first BTS, the second BTS and the third BTS is operating in isolation of each other;
automatically electing the first BTS to provide BSC functionality for at least the second BTS and the third BTS; and
after automatically electing the first BTS to provide BSC functionality for at least the second BTS and the third BTS, reconfiguring the first BTS to provide BTS functionality for at least the second BTS and the third BTS, after which the second BTS and the third BTS are supported by the first BTS for BSC functionality.

62. A first Base Transceiver Station (BTS) comprising:

means for determining that at least a second BTS and a third BTS within a predetermined geographic distance of the first BTS each have Base Station Controller (BSC) capabilities, wherein the first BTS also has BSC capabilities and each of the first BTS, the second BTS and the third BTS is operating in isolation of each other;

means for automatically electing the first BTS to provide BSC functionality for at least the second BTS and the third BTS; and means for reconfiguring the first BTS to provide BTS functionality for at least the second BTS and the third BTS after automatically electing the first BTS to provide BSC functionality for at least the second BTS and the third BTS, after which the second BTS and the third BTS are supported by the first BTS for BSC functionality.

63. A method for reconfiguring a wireless communication network, the method comprising:

determining that at least a second BTS and a third BTS within a predetermined geographic distance of the first BTS each have Base Station Controller (BSC) capabilities, wherein the first BTS also has BSC capabilities and each of the first BTS, the second BTS and the third BTS is operating in isolation of each other;

automatically electing the first BTS to provide BSC functionality for at least the second BTS and the third BTS; and after automatically electing the first BTS to provide BSC functionality for at least the second BTS and the third BTS, reconfiguring the first BTS to provide BTS functionality for at least the second BTS and the third BTS, after which the second BTS and the third BTS are supported by the first BTS for BSC functionality.

\* \* \* \* \*